United States Patent
Bettink et al.

(10) Patent No.: US 7,522,521 B2
(45) Date of Patent: Apr. 21, 2009

(54) ROUTE PROCESSOR ADJUSTING OF LINE CARD ADMISSION CONTROL PARAMETERS FOR PACKETS DESTINED FOR THE ROUTE PROCESSOR

(75) Inventors: John H. W. Bettink, San Jose, CA (US); David Delano Ward, Somerset, WI (US); Jianyu Chen, San Jose, CA (US); Paul Mattes, Minneapolis, MN (US); Norbert Brotz, St. Paul, MN (US)

(73) Assignee: Cisco Technology, Inc., San Jose, CA (US)

( * ) Notice: Subject to any disclaimer, the term of this patent is extended or adjusted under 35 U.S.C. 154(b) by 627 days.

(21) Appl. No.: 11/180,043

(22) Filed: Jul. 12, 2005

(65) Prior Publication Data

US 2007/0014276 A1    Jan. 18, 2007

(51) Int. Cl.
*H04L 12/26* (2006.01)
*G06F 9/00* (2006.01)
(52) U.S. Cl. .................. 370/230; 713/100; 726/13
(58) Field of Classification Search ........... None
See application file for complete search history.

(56) References Cited

U.S. PATENT DOCUMENTS

| | | | |
|---|---|---|---|
| 6,851,028 B1 * | 2/2005 | Mak et al. ............ | 711/154 |
| 7,209,449 B2 | 4/2007 | Tang et al. | |
| 7,299,296 B1 * | 11/2007 | Lo et al. .............. | 709/238 |
| 7,328,451 B2 * | 2/2008 | Aaron .................. | 726/13 |
| 7,333,511 B2 * | 2/2008 | Sandstrom ............ | 370/468 |
| 7,388,840 B2 | 6/2008 | Deval et al. | |
| 7,418,536 B2 * | 8/2008 | Leung et al. .......... | 710/306 |
| 2002/0010800 A1 * | 1/2002 | Riley et al. ........... | 709/249 |
| 2003/0014665 A1 * | 1/2003 | Anderson et al. ...... | 713/201 |
| 2003/0126468 A1 * | 7/2003 | Markham ............. | 713/201 |
| 2003/0185226 A1 | 10/2003 | Tang et al. | |
| 2003/0210705 A1 | 11/2003 | Seddigh et al. | |
| 2004/0078485 A1 * | 4/2004 | Narayanan ........... | 709/242 |
| 2004/0146006 A1 * | 7/2004 | Jackson ............... | 370/230 |
| 2005/0050136 A1 | 3/2005 | Golla | |

(Continued)

OTHER PUBLICATIONS

"Cisco CRS-1 Security", Cisco Systems, Inc., May 2004, 7 pages.

(Continued)

*Primary Examiner*—Edan Orgad
*Assistant Examiner*—Timothy J Weidner
(74) *Attorney, Agent, or Firm*—The Law Office of Kirk D. Williams

(57) ABSTRACT

Disclosed are, inter alia, methods, apparatus, data structures, computer-readable media, and mechanisms, for a route processor adjusting admission control policies for packets destined for the route processor and enforced on line cards. Individual line cards can identify offending packet flows that pass through them. However, for example, it is possible that an attack on the route processor might comprise packets being forwarded to the route processor from different line cards, with these packets belonging to a same or different packet flow. By monitoring and identifying offending packet flows, the route processor can inform at least the line cards corresponding to these offending packet flows in order to adjust their corresponding admission control policies to combat such an attack, while typically allowing legitimate traffic to continue to flow at the desired rate to the route processor.

18 Claims, 11 Drawing Sheets

U.S. PATENT DOCUMENTS

| | | | |
|---|---|---|---|
| 2005/0074001 A1* | 4/2005 | Mattes et al. | 370/389 |
| 2005/0213570 A1* | 9/2005 | Stacy et al. | 370/389 |
| 2005/0265307 A1 | 12/2005 | Wybenga et al. | |
| 2006/0029104 A1* | 2/2006 | Jungck | 370/498 |
| 2008/0247333 A1* | 10/2008 | Ban | 370/254 |

OTHER PUBLICATIONS

"Policy Framework Configuration Guide," Release 6.2, Juniper Networks, Inc. Sunnyvale, California, 2003, 318 pages.

Gill, Vijay, "Lack of Classification Ability Considered Harmful", America Online Presentation, Feb. 2003, 12 pages.

P. Ferguson and D. Senie, "Network Ingress Filtering: Defeating Denial of Service Attacks Which Employ IP Source Address Spoofing", RFC 2267, Jan. 1998, 10 pages.

P. Ferguson and D. Senie, "Network Ingress Filtering: Defeating Denial of Service Attacks Which Employ IP Source Address Spoofing", RFC 2827, May 2000, 10 pages.

Gill et al., "The Generalized TTL Security Mechanism (GTSM)", RFC 3682, Feb. 2004, 11 pages.

U.S. Appl. No. 11/179,352, filed Jul. 12, 2005, Bettink et al.

* cited by examiner

US 7,522,521 B2

ROUTE PROCESSOR ADJUSTING OF LINE CARD ADMISSION CONTROL PARAMETERS FOR PACKETS DESTINED FOR THE ROUTE PROCESSOR

TECHNICAL FIELD

One embodiment of the invention relates to communications and computer systems, especially routers, packet switching systems, computers, and other networking or networked devices; and more particularly, one embodiment relates to a route processor adjusting the admission control policies enforced on line cards for packets destined for the route processor.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

For service providers, network security is a matter of business survival. Security incidents due to viruses, intrusion, operator error, and software configuration error can involve extensive associated costs and consequences such as service disruption, financial loss, dissatisfied customers, reduced productivity, and even media attention. To protect their revenue and profits, service providers must protect their infrastructures and offer managed services for secure connectivity, threat defense, and endpoint protection.

To maintain high availability in an environment of increasing security threat (for example, distributed-denial-of-service [DDoS] attacks) and policy complexity, service providers are looking to new routing and switching solutions—solutions that offer effective and embedded, hardware-based security instrumentation that enables self-defending networks.

The control plane is where all routing control information is exchanged, making the control plane and its components a target. Because control plane resiliency depends on CPU processing power and scalability, "out-of-resources" attacks against the CPU are not uncommon. To support scalability and performance, a paper entitled "Cisco CRS-1 Security", Cisco Systems, Inc., May 2004, (which is hereby incorporated by reference in its entirety) teaches that a control plane of a router can be designed with distributed and redundant route processors that use symmetric multiprocessing (SMP) CPUs. Cisco CRS-1 Security, Cisco Systems, Inc., May 2004. Under normal operations, the router transit traffic is processed by its line cards at wire rate. However, exceptions occur when packets are directed to the router itself. These "punted packets," which include routing protocol, Internet Control Message Protocol (ICMP), and network management packets, are directed from the line card packet processor to either the line card CPU or route processor CPU. To safeguard the control plane against DoS attacks in an open environment, multiple, layered security features can be distributed to the line card and its packet processors, with these features including: dynamic control plane protection (DCPP), automatic control plane congestion filter, control plane time-to-live (TTL) sanity check (RFC 3682, Generalized TTL Security Mechanism (GTSM), Border Gateway Protocol (BGP) routing protocol filtering and Route Policy Language (RPL).

Unauthorized or deliberately malicious routing updates caused by violations such as an intruder diverting or analyzing network traffic can compromise network security. Implementing neighbor router authentication with Message Digest Algorithm 5 (MD5) is a common way to avoid spoofing, and it virtually ensures that the router receives reliable information from a trusted source—but it is only a first step. If spoofed BGP packets start spraying toward the router, receive-path access control lists (ACLs) and modular QoS CLI (MQC) rate limits control exactly where these packets can proceed. However, ACL and MQC controls are not automated. If BGP peers go down or restart, the Layer 4 port number changes with each session reestablishment. As a result, network designers have been asking for an automated, dynamic way to permit configured BGP peering sessions and drop non-configured sessions.

In response, a router can offer a DCPP scheme for line card packet processing. With DCPP, explicitly configured BGP peering sessions are automatically allocated adequate resources, whereas non-configured sessions are rejected or given minimum treatment. This permit-deny model is based on the association of statically configured IP addresses and dynamic Layer 4 port numbers. Prior to authentication and establishment for maximum admission control, different resource policies exist for initial connections. Control plane packets have to go through multilayer, prescreening schemes until they are authorized through an internal lookup table and allocated adequate resources. This automation frees time spent by network administrators on manual configuration for use on other mission-critical tasks.

Under extreme DoS or DDoS attacks that cause line cards to exceed router slot capacity, control mechanisms perform at hardware application-specific integrated circuit (ASIC) rate, beyond line card capacity, to drain packets into the Silicon Packet Processor (SPP) on the Layer 3 Modular Services Card (MSC) and assure control plane packet-processing priority. This feature maintains topology while the network administrator uses other security tools to install mitigation schemes to solve the problem.

Most control protocol peering sessions are established between adjacent or directly connected routers. Prior to GTSM (formerly known as BGP TTL Security Hack [BTSH]), BGP packets directed at the router from non-directed peering points had to be processed by the router CPU. When enough of these packets were generated, it effectively created a massive DDoS attack that exhausted CPU resources. Now, with GTSM, a TTL check on BGP peering packets can effectively block all nondirected BGP spoofing in MSC SPPs.

These techniques may also be applied to many other applications, such as Label Distribution Protocol (LDP) and Resource Reservation Protocol (RSVP), which can take advantage of the features of generalized GTSM. Because of the fully programmable MSC architecture in the router, GTSM support for other application protocols can be easily added to MSCs.

SUMMARY OF THE INVENTION

Disclosed are, inter alia, methods, apparatus, data structures, computer-readable media, and mechanisms, for a route processor adjusting admission control policies for packets destined for the route processor and enforced on line cards.

Individual line cards can identify offending packet flows that pass through them. However, for example, it is possible that an attack on the route processor might comprise packets being forwarded to the route processor from different line cards, with these packets belonging to a same or different packet flow. By monitoring and identifying offending packet flows, the route processor can inform at least the line cards corresponding to these offending packet flows in order to adjust the corresponding admission control policies to combat such an attack, while allowing legitimate traffic to continue to flow at the desired rate to the route processor.

In one embodiment, a routing device includes a route processor for processing route updates and multiple line cards communicatively coupled to the route processor. The route processor includes a route processing mechanism, packet storage for storing packets received from the line cards, and one or more resource monitoring mechanisms for identifying one or more resource utilization values representative of traffic destined for the route processor and received from the line cards. Each of the line cards includes one or more external interfaces for sending and receiving packets; a forwarding lookup mechanism for identifying packets destined for the route processor; and an admission control enforcement mechanism for limiting traffic it respectively sends to the route processor. The route processor is configured to communicate with the line cards in order to cause the admission control enforcement mechanisms of one or more offending line card sources to reduce traffic being sent to the route processing mechanism in response to the resource utilization values reaching or exceeding a predetermined value.

One embodiment of a routing device includes a route processor for processing route updates and multiple line cards. Each of the multiple line cards includes means for identifying, admission control enforcement, and forwarding packets of the received packets destined for the route processor. The means for admission control enforcement includes means for modifying its admission control parameters in response to communication from the route processor. The route processor includes means for processing route processor requests and route updates, means for storing packets received from the line cards, means for monitoring flows of said traffic in order to identify an offending flow, and means for communicating to said line cards to cause at least one of said line cards to modify one or more of its said admission control parameters associated with the offending flow.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
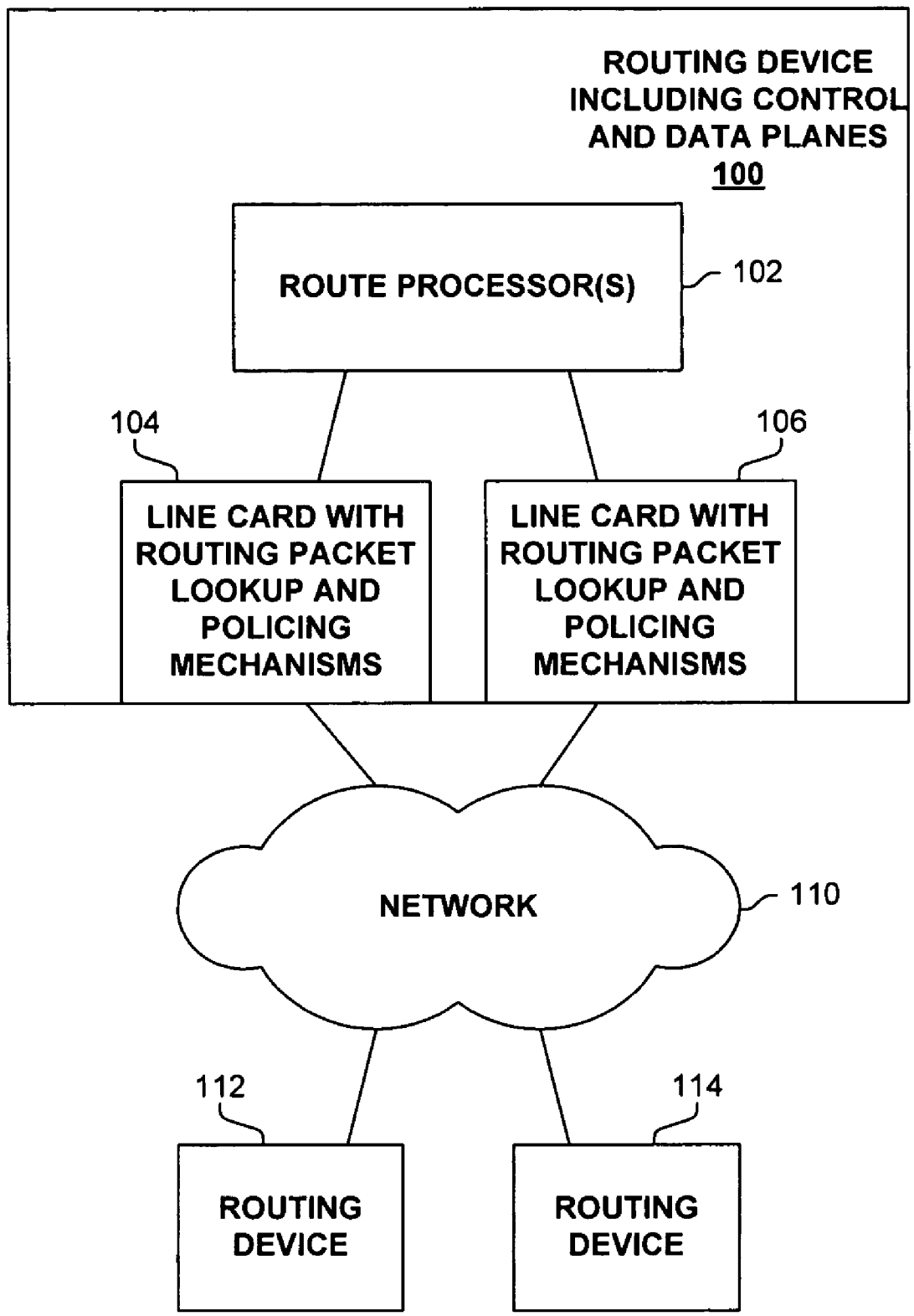
FIG. 1 is a block diagram of a routing device used in one embodiment.

Disclosed are, inter alia, methods, apparatus, data structures, computer-readable media, and mechanisms, for identifying admission control policies for packets destined to the control plane of a routing device. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to, all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term, which includes, but is not limited to, any memory, storage device, storage mechanism, etc. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, which refers to all types of known or future developed associative memories, such as, but not limited to binary and ternary content-addressable memories, hash tables, etc. Additionally, the term "associative memory unit" may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium or media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular form of a noun is non-limiting, with its use typically including one or more of the particular thing rather than just one (e.g., the use of the word "memory" typically refers to one or more memories without having to specify "memory or memories," or "one or more memories" or "at least one memory," etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, and mechanisms, for dynamically controlling the rate and/or internal priority of packets destined for the control plane of a routing device.

For example, a routing device of one embodiment includes: means for identifying routing device destined packets whose destination is a control plane of the routing device; means for identifying one or more admission parameters based on classification configuration values for each of said routing device destined packets identified by said means for identifying routing device destined packets whose destination is the control plane of the routing device; means for dynamically updating said admission parameters and said classification configuration values in response to changes in status of routing communication sessions between the routing device and one or more peer routing devices, at least some of said routing device destined packets corresponding to said communications sessions; and means for enforcing said identified admission parameters corresponding to said routing device destined packets. Examples of the enforcement of the admission control include, but are not limited to policing, shaping, weighted tail drop thresholds, random early detection (RED), weighted random early detection (WRED), control plane internal priority, etc. The admission control parameters may include a specification of which type(s) or enforcement mechanisms to use, and/or typically specify characteristics (e.g., policing rates, drop thresholds, internal priority levels, shaping queues, etc.) to be used by the enforcement mechanism(s) used in controlling the access to the control plane.

A routing device of one embodiment includes: a route processor; a forwarding lookup mechanism for identifying packets destined for the route processor; a lookup mechanism for identifying admission control parameters for said identified packets destined for the route processor; and an admission control enforcement mechanism for enforcing said identified admission control parameters for said identified packets destined for the route processor. The lookup mechanism is configured to store a plurality of entries for matching against lookup words derived from fields of said packets to identify said admission control parameters, said fields including a remote source address, a remote source port, a local destination address, and a local destination port; wherein said entries include different categories of entries; wherein each of said entries corresponding to a second category of said categories includes a specific value for the remote source address, and don't care values for the local destination address and at least one of the remote source port and the local destination port; and wherein each of said entries corresponding to a third category of said categories includes don't care values for the remote source address, the remote source port, and the local destination address. The lookup mechanism is configured to update the said entries of a first category of said categories in response to the route processor establishing communications sessions between the first routing device and other routing devices for exchanging routing information, each of said first entries includes remote source address, remote source port, local destination address, and local destination port specific values for identifying whether or not a said packet belongs to the communications session.

In one embodiment, the lookup update mechanism is configured to remove a particular entry of said entries of the first category in response to a communications session corresponding to the particular entry being torn down. In one embodiment, said admission control parameters corresponding to said entries of the first category provide for a higher rate than said admission control parameters corresponding to said entries of the second category, and wherein said admission control parameters corresponding to said entries of the second category provide for a higher rate than admission control parameters corresponding to said entries of the third category. In one embodiment, said policing policy parameters corresponding to said entries of the first category provide for a higher rate than said policing policy parameters corresponding to said entries of the second category, and wherein said admission control parameters corresponding to said entries of the second category provide for a higher rate than said admission control parameters corresponding to said entries of the third category. In one embodiment, at least one of said admission control parameters corresponds to an internal priority for the route processor; and wherein the admission control enforcement mechanism is configured to cause identified packets destined for the route processor to be processed according to corresponding internal priorities.

In one embodiment, a routing device includes: a route processor, a forwarding lookup mechanism for identifying packets destined for the route processor; a lookup mechanism for identifying policing policy parameters for packets destined for the route processor; and a policing mechanism for enforcing the identified policing policy parameters for the packets. In one embodiment, the lookup mechanism typically includes: a ternary content-addressable memory, memory storage, and a ternary content-addressable memory update mechanism.

In one embodiment, the ternary content-addressable memory is configured to store multiple entries for matching against lookup words derived from fields of the packets to identify the policing policy parameters stored in the memory storage at locations corresponding to the entries. In one embodiment, each of the entries includes a remote source address, a remote source port, a local destination address, and a local destination port. All of the entries are compared to each of the lookup words—in other words, the entries are not partitioned into logical groups identified by a logical group identifier such that less than all of the entries are searched at a time. In one embodiment, there are different categories of entries, with each of the entries corresponding to a second category including a specific value for the remote source address, and don't care values for the local destination address and at least one of the remote source port and the local destination port; and with each of the entries corresponding to a third category including don't care values for the remote source address, the remote source port, and the local destination address. In one embodiment, the ternary content-addressable memory update mechanism is configured to update the ternary content-addressable memory with entries of a first category of the categories in response to the route processor establishing communications sessions between the first routing device and other routing devices for exchanging routing information, each of the first entries includes remote source address, remote source port, local destination address, and local destination port specific values for identifying whether or not a packet belongs to the communications session. In one embodiment, the third category of entries are placed below in the matching priority the first and second category of entries in the ternary content-addressable memory, such that a match to an entry of the first or a second category will be identified over a simultaneous match to an entry of the third category. In one embodiment, the second category of entries are placed below in the matching priority the first category of entries in the ternary content-addressable memory, such that a match to an entry of the first category will be identified over a simultaneous match to an entry of the second category.

In one embodiment, the ternary content-addressable memory update mechanism is configured to remove a particular entry of the first category in response to a communications session corresponding to the particular entry being torn down. In one embodiment, the policing policy parameters corresponding to entries of the first category provide for a higher rate than said policing policy parameters corresponding to entries of the second category. In one embodiment, the policing policy parameters corresponding to entries of the second category provide for a higher rate than the policing policy parameters corresponding to entries of the third category. In one embodiment, the memory storage also includes priority tags stored in said memory storage at locations corresponding to the entries for identifying a priority of a plurality of priorities to use in deciding when to keep or drop a corresponding packet in preference to other packets when resources such as, but not limited to, buffer space becomes scarce, or when to process the corresponding packet before or after other packets of a lower priority.

In one embodiment, the routing device uses ternary content-addressable memories (TCAMs) to identify policing and/or priority tags corresponding to a packet. TCAMs are typically hardware devices that allow packet header fields to be looked up at line rate, and includes a mask so that fields can be wild-carded (e.g., don't care fields) in any entry to classify each packet that is destined for the router itself. The payload of a matched TCAM entry indicates (e.g., the address corresponds to an address in an adjunct memory storage device) policer parameters (e.g., an average, maximum and/or burst rate used to limit the number of packets admitted per unit of time) and one or more priority tags (used to decide when to keep or drop a packet in preference to other packets when resources such as buffer space becomes scarce, or when to process a packet before or after other packets).

In one embodiment, the TCAM contains entries for each control protocol that the router supports, and for a given control protocol, the TCAM typically contains three kinds or categories of entries for conferring different levels of trust (implied authentication) on different packets. A first category includes dynamically-created entries for established peering sessions, which are typically generated and removed dynamically as the sessions are established and torn down. These entries typically match a specific layer 3 protocol, layer 4 protocol, source and destination addresses, and source and destination port numbers (if applicable), and ingress interface (if applicable). These entries are typically associated with the highest policing rate, and are created dynamically as a peering session is established. These entries appear first in the TCAM and thus are matched before the other kinds of entries below. Thus, packets for established peering sessions may be serviced at a higher allocated bandwidth and/or priority.

A second category includes entries for configured peers. These entries use wild-card (e.g., don't care) values for the destination address and the source or destination port numbers. They match session initiation packets from known peers, and the first few data packets of each session during the latency period as the established-session entries are being added to the hardware. They are generated when a peer is configured. They are associated with a lower policing rate.

A third category includes static default entries for the protocol. These entries match session-initiation and early data packets from known peers, during the latency period as the configured peer entries are being added to the hardware. They are statically generated, and are associated with a very low policing rate.

The vast majority of control protocol packets generated by an attacker would match the default entries, and would be dropped by the policer. Typically, at most, they would briefly delay the establishment of sessions with a newly-configured peers. Attack packets that successfully guessed a peer's address would be policed at a higher rate, but the resources used by these packets would be very small. The primary effect would be to slow the establishment of new peering sessions. Only attack packets that successfully guessed the entire key for an active session (layer 3 protocol, layer 4 protocol, source addresses, destination address, source port, destination port) would be admitted to the router in any quantity and potentially interfere with its operation.

Thus, in one embodiment, the use of the different categories of packet classification for packets destined for a route processor and their corresponding different policing rates and priorities, provides a dynamic DoS attack exposure of the routing device, which can be modified in real time. The routing device typically polices control protocol packets that appear to be from established control sessions at a much higher rate than those that appear to be new session packets from configured peers, and polices other control protocol packets at a very low rate. This typically makes is much harder for an attacker to guess or systematically scan the port number and address spaces and successfully disrupt the operation of the router.

In one embodiment, a route processor can affect the admission control policies for packets destined for the route processor and enforced on line cards. Individual line cards can identify offending packet flows that pass through them. However, for example, it is possible that an attack on the route processor might comprise packets being forwarded to the route processor from different line cards, with these packets belonging to a same or different packet flow. By monitoring and identifying offending packet flows, the route processor can inform at least the line cards corresponding to these offending packet flows in order to adjust the corresponding admission control policies to combat such an attack, while allowing legitimate traffic to continue to flow at the desired rate to the route processor.

In one embodiment, a routing device includes a route processor for processing route updates and multiple line cards communicatively coupled to the route processor. The route processor includes a route processing mechanism, packet storage for storing packets received from the line cards, and one or more resource monitoring mechanisms for identifying one or more resource utilization values representative of traffic destined for the route processor and received from the line cards. Each of the line cards includes one or more external interfaces for sending and receiving packets, a forwarding lookup mechanism for identifying packets destined for the route processor; and an admission control enforcement mechanism for limiting traffic it respectively sends to the route processor. The route processor is configured to communicate with the line cards in order to cause the admission control enforcement mechanisms of one or more offending line card sources to reduce traffic being sent to the route processing mechanism in response to the resource utilization values reaching or exceeding a predetermined value.

In one embodiment, each of the line cards includes a lookup mechanism for identifying admission control parameters for packets destined for the route processor, which are communicated to all or a subset of the line cards, and the admission control enforcement mechanisms of the line cards are configured to enforce these identified admission control policy parameters. In one embodiment, the route processor is configured to communicate these updated admission control parameters to the line cards only if the utilization of the route processing mechanism equals or exceeds a predetermined threshold value. In one embodiment, packets containing the updated admission control values or instructions are broadcast to the line cards. In one embodiment, the resource utilization values include a measurement of the storage utilization for the storing of packets in the storage. In one embodiment, the storage stores said packets in one or more queues, and the resource utilization values include at least one measurement of a queue depth of packets stored in at least one of the queues. In one embodiment, the traffic being sent to the route processing mechanism includes offending and non-offending flows of traffic, and the route processor is configured to identify the offending flows of traffic, and to communicate indications of the offending flows to the offending line card sources. The offending line card sources are configured to reduce the traffic of the offending flow while not reducing the traffic of the non-offending flows in response to receiving the indications. In one embodiment, communicating with the line cards includes sending messages only to said offending line card sources. In one embodiment, the route processor is configured to identify a flow characterization of offending traffic, communicating with the line cards includes providing an indication of the flow characterization, and the admission control enforcement mechanisms of the line cards are configured to react to the indication of the flow characterization in order to reduce or eliminate traffic being sent to the route processor corresponding to the flow characterization.

In one embodiment, the route processor is configured to communicate with the line cards in order to cause the admission control enforcement mechanisms of the line cards to increase traffic being sent to the route processing mechanism in response to said resource utilization values equaling or falling below a second predetermined value. In one embodiment, the route processor is configured to process communications application requests originated from remote devices for communicating with the routing device, with these applications requests typically including an offending flow of communications application requests and a non-offending flow of communications application requests; and the route processor is configured to identify the offending flow and to communicate indications of the offending flow to the offending line card sources, which are configured to reduce the traffic of the offending flow while not reducing the traffic of the non-offending flows in response.

One embodiment of a routing device includes a route processor for processing route updates and multiple line cards. Each of the multiple line cards includes means for identifying, admission control enforcement and forwarding packets of the received packets destined for the route processor. The means for admission control enforcement including means for modifying its admission control parameters in response to communication from the route processor. The route processor includes a means for processing route processor requests and route updates, means for storing packets received from the line cards, means for monitoring flows of said traffic in order to identify an offending flow, and means for communicating to said line cards to cause at least one of said line cards to modify one or more of its said admission control parameters associated with the offending flow.

In one embodiment, said causing at least one of said line cards to modify said admission control parameters associated with the offending flow includes causing two or more of said line cards to modify their respective said admission control parameters associated with the offending flow. In one embodiment, said resource utilization values include a load utilization value of said means for processing route processor requests and route updates, and wherein the route processor only said communicates to said line cards to cause at least one of said line cards to modify one or more of its said admission control parameters associated with the offending flow when the load utilization value equals or exceeds a predetermined threshold value. In one embodiment, said means for communicating with said line cards includes means for sending a broadcasting packet to each of the line cards of an indication of the offending flow. In one embodiment, said means for communicating with said line cards includes means for sending packets only to those line cards associated the offending flow. In one embodiment, the route processor includes means for identifying resource utilization values representative of traffic destined for the route processor and received from the line cards, said resource utilization values include a measurement of the storage utilization for said means for storing packets; and wherein in response to the storage utilization exceeding a threshold, the route processor is configured to identify the offending flow and to communicate to said line cards to cause at least one of said line cards to modify one or more of its said admission control parameters associated with the offending flow. In one embodiment, said resource utilization values include a load utilization value of said means for processing route processor requests and route updates, and wherein the route processor only said communicates to said line cards to cause at least one of said line cards to modify one or more of its said admission control parameters associated with the offending flow when the load utilization value equals or exceeds a predetermined threshold value. In one embodiment, the route processor is configured to communicate with the line cards in order to cause said admission control enforcement mechanisms of said one or more of said line cards to increase traffic being sent to the route processing mechanism in response to said resource utilization values equaling or falling below a second predetermined value. In one embodiment, the route processor is configured to communicate with the line cards in order to cause said admission control enforcement mechanisms of said one or more of said line cards to increase traffic being sent to the route processing mechanism in response to said resource utilization values equaling or falling below a second predetermined value.

Turning to the figures, FIG. 1 illustrates a routing device 100 used in one embodiment. A routing device typically includes a data and control planes. The data plane refers to the components and mechanisms used to process and forward packets passing through the routing device, while the control plane refers to the components and mechanisms (typically including one or more route processing devices) used to control the routing device, including processing received packets destined for the control plane of the router (e.g., packets whose ultimate destination is the routing device as opposed to those packets with a received destination address of the routing device which the routing device processes and forwards to packet to the next device). For example, typically a route processor of the control plane communicates with peer devices for exchanging routing information via established protocols (e.g., Border Gateway Protocol, etc.), and processes application requests originated from remote devices and for communicating with the routing device (e.g., telnet, ssh, ldp, and other applications to the routing device, etc.). Note, the control plane may include the route processor(s) and portions of the line cards and other devices.

As shown, routing device 100 (e.g., a router, or any other communications or computing engine that provides routing functionality) includes one or more route processors 102. The "term route processor" as used herein, and consistent with common usage, refers to a subsystem or board communicatively coupled to multiple line cards, with the route processor including one or more processing elements (e.g., CPUs) performing at least one of an extensible set of tasks, including, but not limited to, receiving and processing route updates (e.g., BGP sessions) and application requests originated from remote devices and for communicating with the routing device (e.g., telnet, ssh, ldp, and other applications to the routing device, etc.). Routing device 100 includes multiple line cards 104-106 for interfacing with external devices, at least to receive and send packets. Line cards 104-106 include functionality for identifying admission control policies (e.g., parameters thereof) and for enforcing these admission control policies for packets destined for a route processor. As shown, routing device 100 is connected to network 110, which may include hosts and other routing devices. Network 110 is explicitly shown to connected to multiple routing devices 100, 112-114, which typically communicate via routing communications sessions (e.g., BGP) for communicating routing information.

Figure 2:
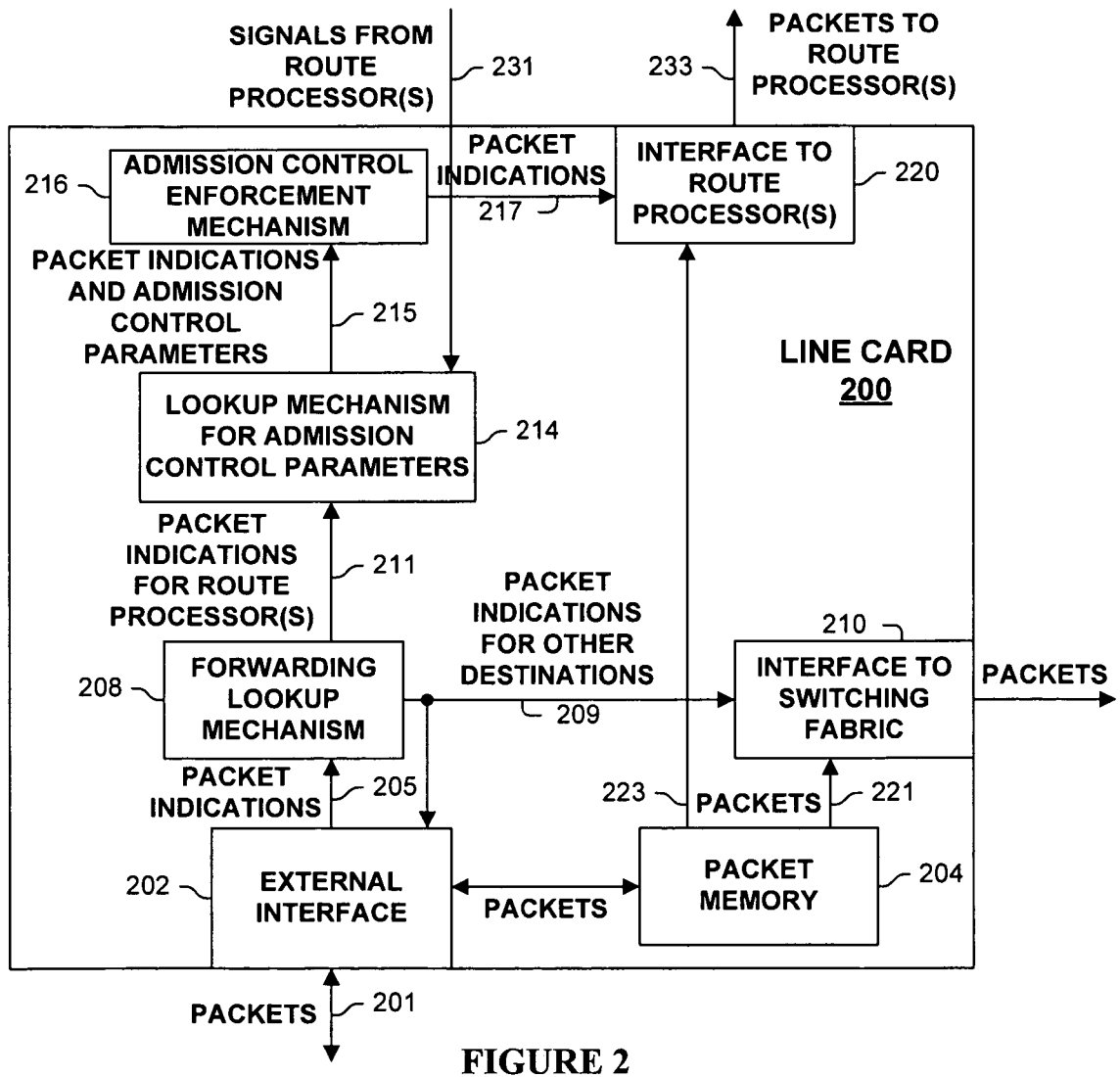
FIG. 2 is a block diagram of a line card used in one embodiment.

FIG. 2 illustrates functionality performed in one embodiment of a line card 200. External packets 201 are received (and transmitted) external interface 202. A received packet is typically stored in packet memory 204. Typically, the information contained in a packet's header and possibly a subset of its packet data is required for processing the routing and admission control determinations for a packet. Typically, the term "packet" is used herein to describe the packet or a portion thereof. However, FIG. 2 uses the term "packet indications" to illustrate the processing of a packet using a portion of the packet.

Packet indications 205 are forwarded to a forwarding lookup mechanism to identify whether the packet is destined for this routing device (e.g., to the control plane) or for another device. Packet indications for other destinations 209 are forwarded to either to external interface 202 or interface to switching fabric 210 (e.g., to be sent to other line cards), and in response, the packets are retrieved from packet memory 204 and accordingly forwarded (having been processed to update any fields that need to be as well known in the art).

Otherwise, forwarding lookup mechanism 208 has identified that the packet is designated to be forwarded to the control plane, and typically to one or more of the routing devices route processors. Packet indications 211 are forwarded to a lookup mechanism 214 for identifying admission control parameters for use in controlling access to the control plane or possibly more specifically controlling access to one or more route processors. Indications 215 are forwarded to admission control enforcement mechanism 216 which performs the admission control based on the admission control parameters. Note, in one embodiment, lookup mechanism 214 is responsive to signals 231 received from the route processor(s) indicating the establishment and tear down of communications sessions between routing devices for communicating routing and/or other information. Conventional admission control techniques known in the art or subsequently developed may be used. Those packet indications 217 that are not dropped by admission control enforcement mechanism 216 are forwarded to interface to route processor (s) 220, which retrieves the packet from packet memory 204, and forwards these packets 233 to the control plane/route processor(s). Note, in one embodiment, packet indications 217 include a priority tag (an admission control parameter) indicating its determined priority by lookup mechanism 214, which may be used by interface 220 or the route processor(s).

Figure 3A:
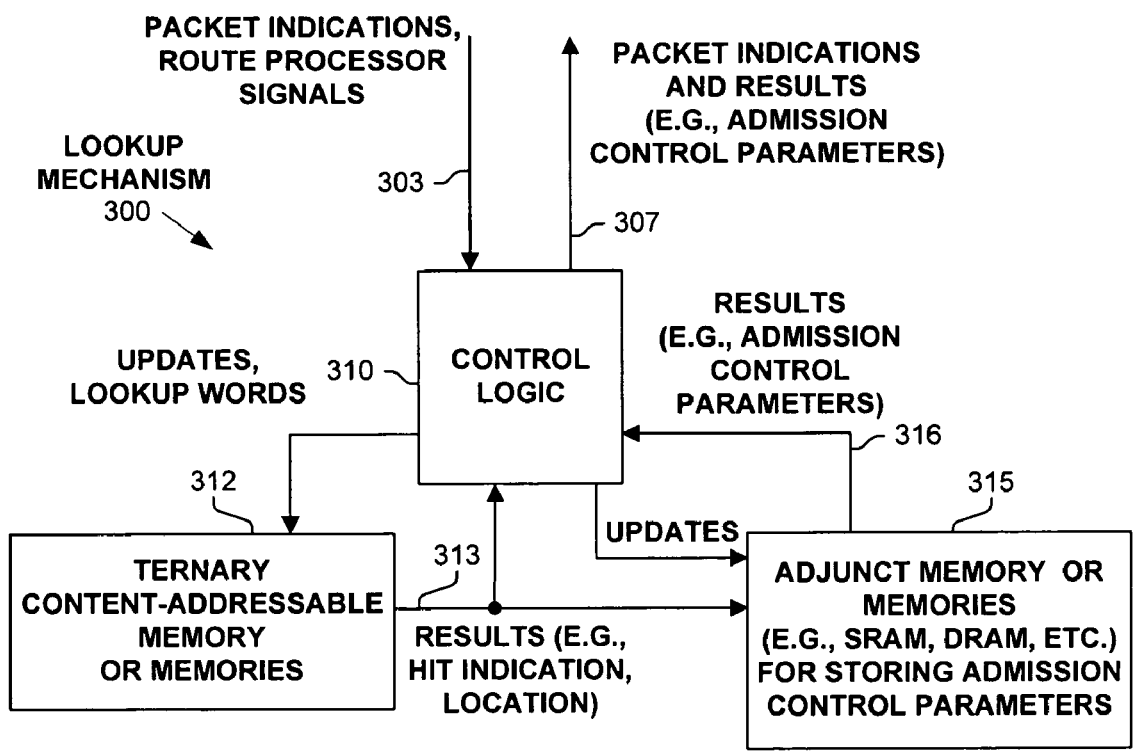
FIG. 3A is a block diagram of lookup mechanism for identifying control plane admission control parameters used in one embodiment.

FIG. 3A is a block diagram of lookup mechanism 300 for identifying admission control parameters used in one embodiment. Note, any type of known or subsequently discovered lookup mechanism can be used, such as, but not limited to those including an associative memory, a data base or other data structure. One embodiment specifically uses a ternary content-addressable memory because of its currently perceived implementation advantages, but of course, other embodiments may employ lookup mechanism(s) that use another or other basic lookup mechanism(s).

As shown, control logic 310 receives signals 303 of packet indications and those from a route processor. In response to signals 303 from a route processor, control logic 310 possibly updates ternary content-addressable memory or memories 312 and/or adjunct memory or memories 315. In response to a signal 303 including a packet indication, control logic 310 generates a lookup word for use in performing a lookup operation on TCAM(s) 312, which generates a result 313 indicating the address of the matching entry, which is used to perform a lookup operation on memory or memories 315 to generate results 315, e.g., the admission control parameter(s). In response, control logic 310 forwards (307) the packet indication and admission control parameters.

Figure 3B:
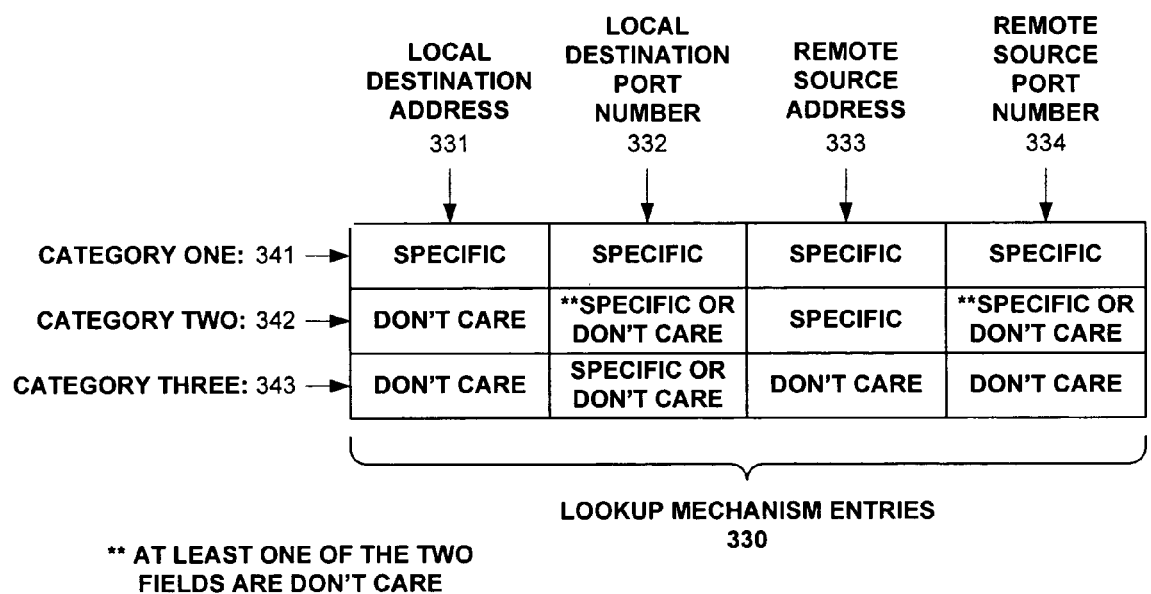
FIG. 3B is a block diagram of categories of lookup mechanism entries used in one embodiment.

FIG. 3B is a block diagram illustrating categories 341-343 of lookup mechanism entries 330 used in one embodiment (possibly with other categories, of course). Many different classification configuration values may be used to identify the admission control policy corresponding to a particular packet. Examples of these classification configuration values include, but are not limited to, local destination address, local destination port number, remote source address, remote source port number, protocol type, time-to-live value, and other fields or subfields of the header and/or data portion of a packet, as well as possibly other characteristics such as the interface or physical port on which the packet was received, etc.

In one embodiment, these categories 341-343 can be characterized by the four values of local destination address 331, local destination port number 332, remote source address 333, and remote source port number 334. In one embodiment, a first category 341 has specific values for each of values 331-334; a second category 342 includes a don't care (i.e., wildcard) value for the local destination address 331 and remote source address 333, while at least one of values 332 and 334 are don't care; and a third category 343 has don't care values for values 331 and 333-334, while value 332 can be specific or a don't care value. As previously discussed herein, in one embodiment, first category 341 includes dynamically-created entries for established peering sessions, second category 342 includes entries for configured peers; and third category 343 includes static default entries.

Figure 3C:
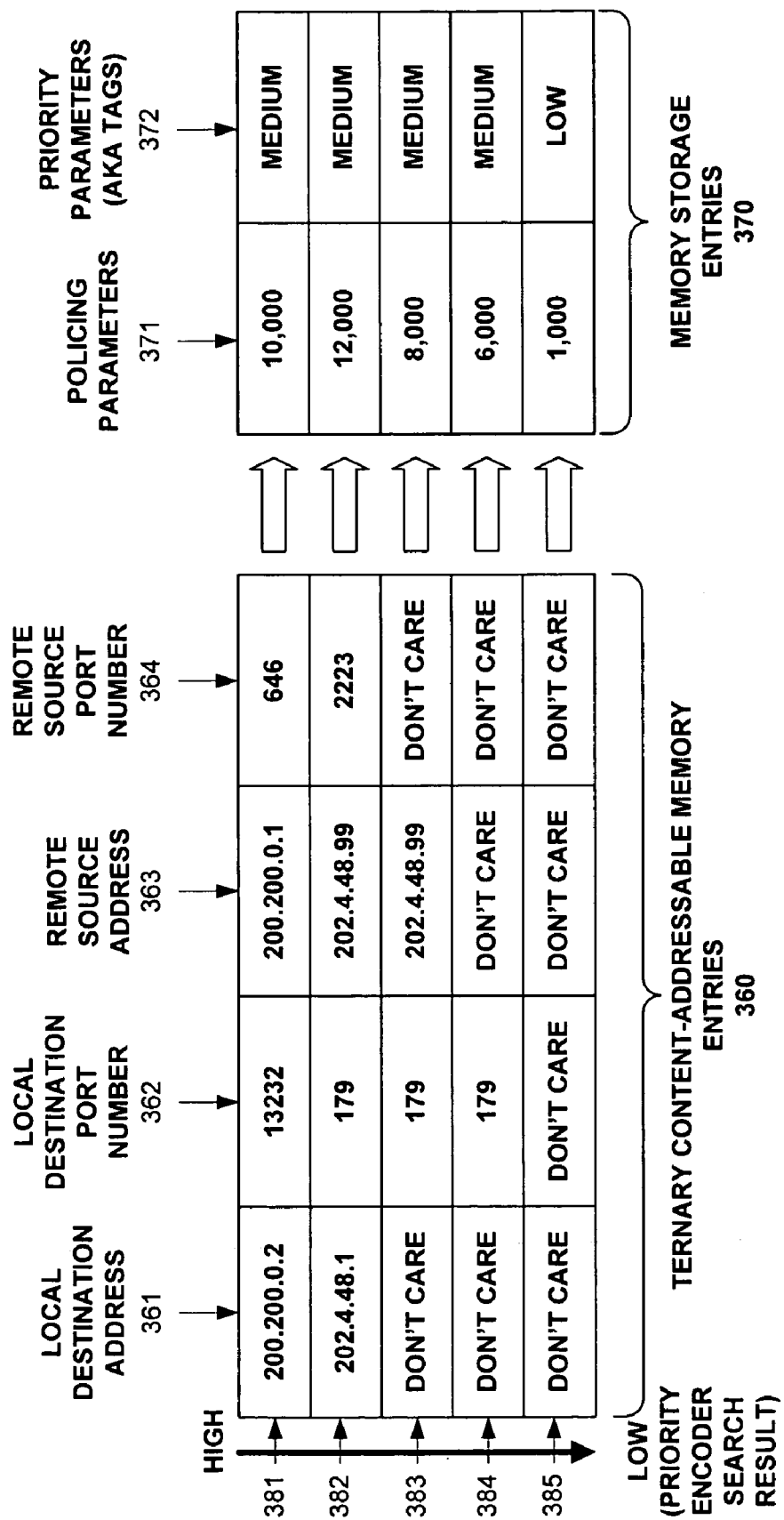
FIG. 3C is a block diagram illustrating a set of ternary content-addressable entries and policing and priority parameters used in an example of one embodiment.

FIG. 3C is a block diagram illustrating an example of a set of ternary content-addressable (TCAM) entries 360 and corresponding admission control parameters, specifically in this example: policing and priority parameters (i.e., tags) 370. As shown, TCAM entries 360 include at least the four fields of local destination address 361, local destination port number 362, remote source address 363, and remote source port number 364; and memory storage entries 370 include policing parameters 371 (e.g., an average, maximum and/or burst rate used to limit the number of packets admitted per unit of time—although only one value is shown for illustrative purposes) and a priority parameter/tag 372. As shown, entries 381-382 are of the first category, entries 383-384 are of the second category, and entry 385 is of the third category. Note, in one embodiment and as illustrated in FIG. 3C, the corresponding policing parameters 371 and priority parameters 372 decrease as the category number increases.

Figure 4:
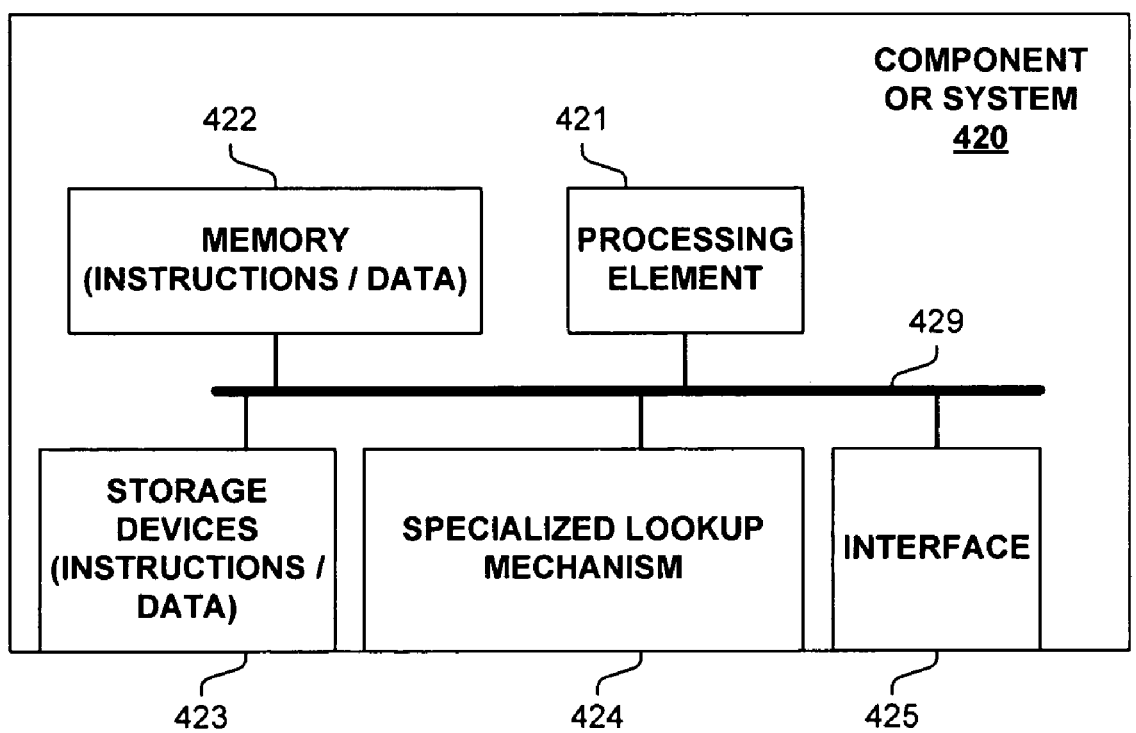
FIG. 4 is a block diagram of a component or system used in one embodiment.

FIG. 4 is a block illustrating a system or component used in one embodiment for identifying admission control policies (e.g., parameters thereof) and for enforcing these admission control polices for packets destined for the control plane, or more specifically, a route processor. In one embodiment, system 420 performs one or more processes corresponding to one of the block or flow diagrams illustrated herein or otherwise described herein.

In one embodiment, system 420 includes a processing element 421, memory 422, storage devices 423, optionally one or more specialized lookup mechanisms 424, and an interface 425 for connecting to other devices, which are coupled via one or more communications mechanisms 429 (shown as a bus for illustrative purposes). Specialized lookup mechanism(s) 424 may include, but is not limited to, an associative memory or more specifically a TCAM.

Various embodiments of system 420 may include more or less elements. The operation of system 420 is typically controlled by processing element 421 using memory 422 and storage devices 423 to perform one or more tasks or processes. Memory 422 is one type of computer readable media, and typically comprises random access memory (RAM), read only memory (ROM), flash memory, integrated circuits, and/or other memory components. Memory 422 typically stores computer executable instructions to be executed by processing element 421 and/or data which is manipulated by processing element 421 for implementing functionality in accordance with one embodiment of the invention. Storage devices 423 are another type of computer readable media, and typically comprise solid state storage media, disk drives, diskettes, networked services, tape drives, and other storage devices. Storage devices 423 typically store computer executable instructions to be executed by processing element 421 and/or data which is manipulated by processing element 421 for implementing functionality in accordance with one embodiment of the invention.

In one embodiment, processing element 421 performs the functionality of a lookup mechanism for performing a lookup operation based on a packet (i.e., packet or indication thereof) in specialized lookup mechanism 424, and then retrieves the admission control parameter(s) from storage memory (e.g., memory 422 and/or storage devices 423).

Figure 5:
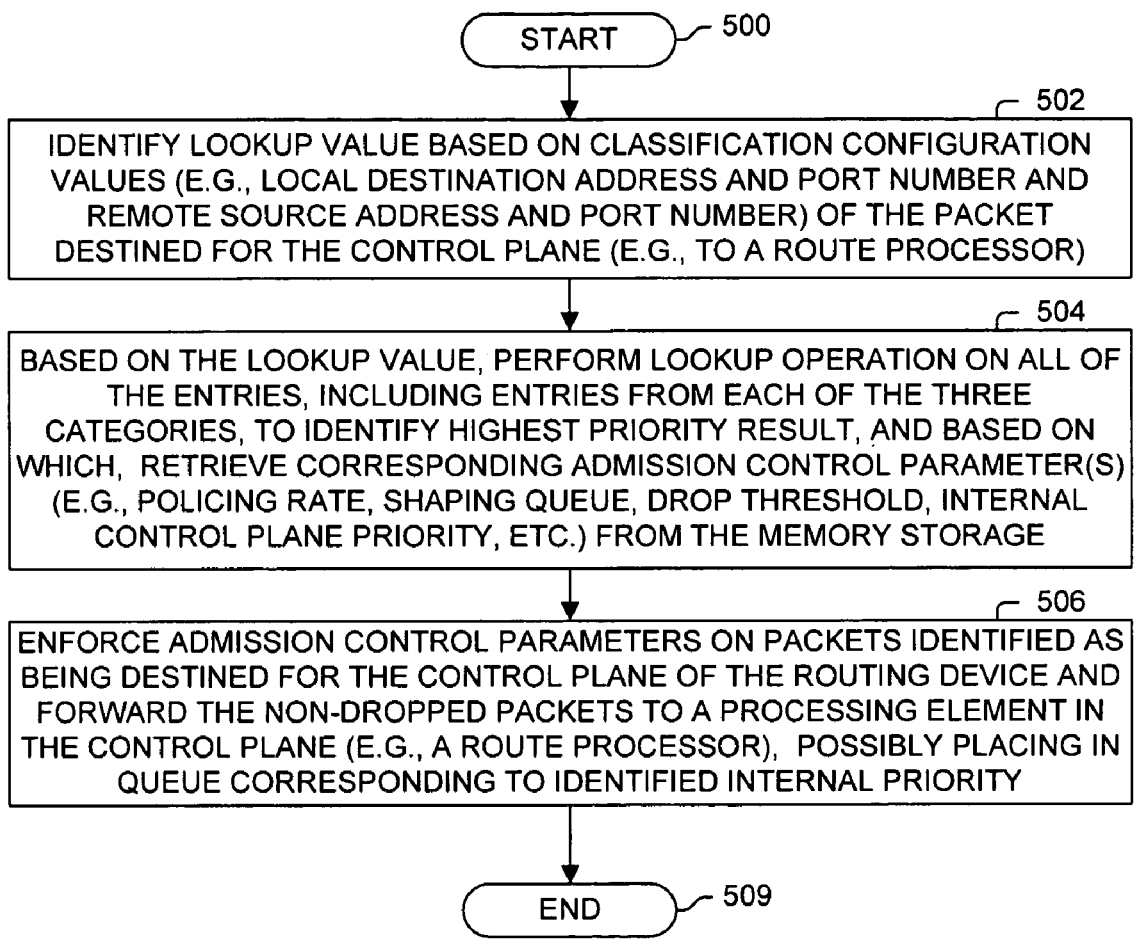
FIG. 5 is a flow diagram illustrating a process for identifying admission control parameters used in one embodiment.

FIG. 5 is a flow diagram illustrating a process for identifying admission control parameters used in one embodiment. Processing begins with process block 500, and proceeds to process block 502, wherein a lookup value is identified based on the classification configuration values (e.g., local destination address and port number and remote source address and port number) of a packet identified as being destined for the control plane (e.g., destined for a route processor). In process block 504, based on the lookup value, a lookup operation is performed on the entries (which for a TCAM, typically includes all entries including entries from each of the three categories) to identify the highest priority result, and based on which, the corresponding admission control parameter(s) are identified (e.g., when using a TCAM, these admission control parameters are typically retrieved from the memory storage based on the location of the highest priority matching location in the TCAM). In process block 506, the identified admission control policy is enforced on the packet according to identified admission control parameters and if the packet is not identified as being dropped, the packet is forwarded to the control plane (e.g., to a route processor), possibly being placed in a queue (or performing other processing) corresponding to an identified control plane internal priority.

Figure 6:
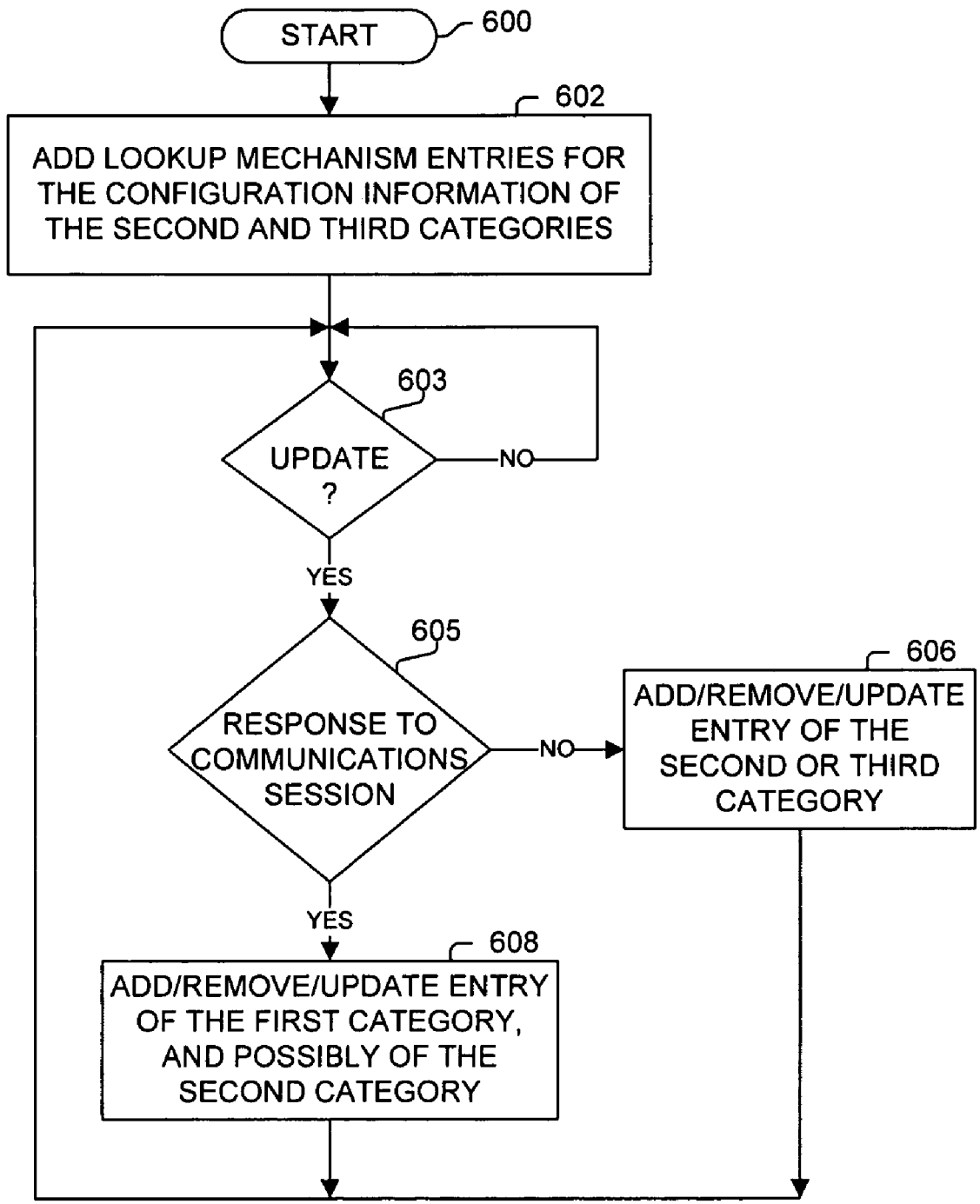
FIG. 6 is a flow diagram illustrating a process for updating lookup mechanism entries in one embodiment.

FIG. 6 is a flow diagram illustrating a process for entries of a lookup mechanism in one embodiment. Processing begins with process block 600, and proceeds to process block 602, wherein lookup mechanism entries are added for the configuration information (e.g., which are specified in a configuration file or via another manner). These entries typically correspond to the second and third categories of entries, as the communications (e.g., TCP/IP) sessions have not yet been established. When an update is required as determined in process block 603, processing proceeds to process block 605. If the update is responsive to a change in a communications session as determined in process block 605, then in process block 608, one or more lookup mechanism entries are updated accordingly, typically that of a first category and possibly that of a second category (e.g., specific values are added to corresponding fields of a second category entry, a first category entry is added and possibly a second category entry is deleted, etc.). Otherwise, in process block 606, one or more entries in the lookup mechanism entries are updated accordingly, typically that of a second or third category. Processing returns to process block 603.

Figure 7:
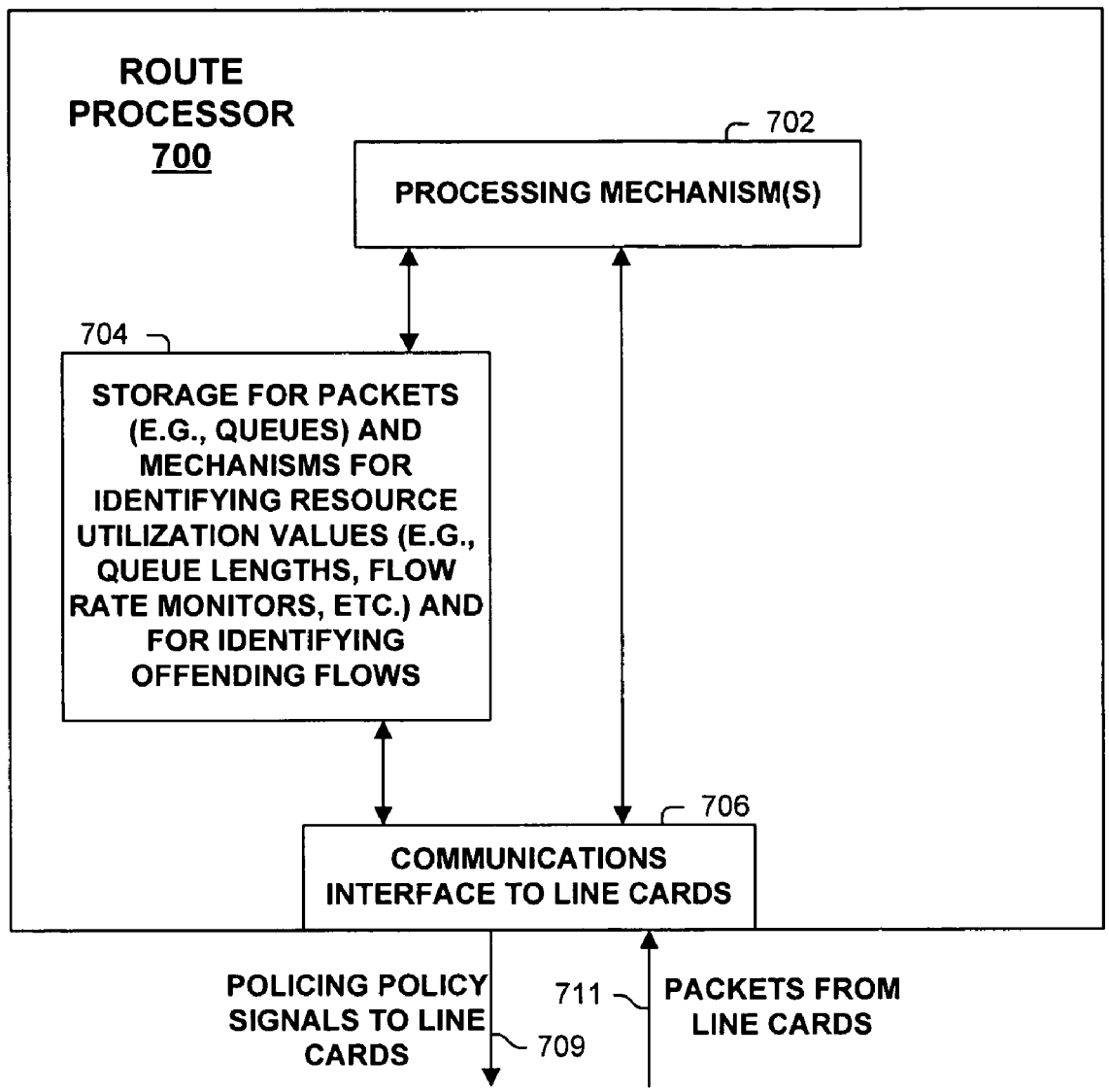
FIG. 7 is a block diagram illustrating a route processor used in one embodiment.

FIG. 7 is a block diagram illustrating a route processor 700 used in one embodiment. The term route processor as used herein and consistent with common usage refers to a subsystem or board communicatively coupled to multiple line cards, with the route processor including one or more processing elements (e.g., CPUs) performing at least one of an extensible set of tasks, including, but not limited to, receiving and processing route updates (e.g., BGP sessions) and application requests originated from remote devices and for communicating with the routing device (e.g., telnet, ssh, ldp, and other applications to the routing device, etc.).

In one embodiment, a route processor can affect the admission control policies for packets destined for the route processor and enforced on line cards. Individual line cards can identify offending packet flows that pass through them. However, for example, it is possible that an attack on the route processor might comprise packets being forwarded to the route processor from different line cards, with these packets belonging to a same or different packet flow. By monitoring and identifying offending packet flows, the route processor can inform at least the line cards corresponding to these offending packet flows in order to adjust their corresponding admission control policies to combat such an attack, while allowing legitimate traffic to continue to flow at the desired rate (or only slightly or less affected than before these adjustments were made) to the route processor.

As shown, route processor 700 includes one or more processing mechanisms 702 (e.g., CPUs or customized hardware typically with some storage such as registers and memory) and is communicatively coupled to commutations interface 706 for communicating with the line cards, such as, but not limited receiving and sending packets from and to line cards of the routing mechanism and for communicating admission control signals to the line cards (which may be in any communications form or format, including, but not limited to packets or electric signals). Storage for packets and mechanisms for identifying resource utilization values and for identifying offending flows 704 is communicatively coupled to processing mechanism 702 and to communications interface 706. In one embodiment, processing mechanism 702 includes component 420 (FIG. 4) or a portion thereof.

In one embodiment, storage 704 includes multiple queues for storing packets, typically with different queues for storing different priorities of traffic, with a mechanism available for identifying the queue length or occupancy level of the queues for use in identifying offending flows. In one embodiment, flow rate monitors are included in mechanism 704. It is well known in the art how to identify the length of a queue and how to monitor packet flows (for example, maintaining packet counts for each flow of which there may be a few to tens of thousands of flows or more that are monitored), and it is well known that certain types of traffic destined for a route processor have certain flow rates. Thus, when a particular flow rate exceeds a normal expected rate (or some function thereof), it may be identified as an offending flow. Note, that all offending flows may or may not be malicious attacks, but may include good or authorized communication with the route processor.

In one embodiment, in identifying offending flows and when and what flows to throttle, route processor 700 considers an extensible set of characteristics, which may include, but is not limited to: the source line card for packets of a flow, the amount of bandwidth consumed by a particular flow (and in relation to the expected amount), the amount of bandwidth used by each service or application (e.g., that possibly of multiple flows, and relation to the expected amount), the amount of bandwidth in total that the route processor(s) can terminate, the current bandwidth loading on the route processor, the CPU loading on the route processor, the packet queue depths in the route processor, the response time or latency of the route processor in getting to processing a received packet, and/or other characteristics. Especially when the load on route processor, the latency in responding to received packets becomes high (e.g., as typically determined by a reflective measured value equaling or exceeding a predetermined threshold) or other resource utilization (e.g., memory occupancy, external queue sizes, etc.) levels become high, route processor 700 is able to identify offending flows to throttle back, and to communicate identified flows and new admission control parameters to use or instructions to adjust their admission control parameters to the line cards that are the source of these offending packets or to all line cards (e.g., via a broadcast mechanism—such as broadcasting packets to all line cards). Similarly, and especially the when the load on route processor lowers, the latency in responding to received packets returns to a normal amount (e.g., as typically determined by a reflective measured value equaling or exceeding a predetermined threshold) or other resource utilization levels (e.g., memory occupancy, external queue sizes, etc.) return to normal, route processor 700 is able to communicate with previously throttled back or all line cards to instruct them to increase the policing traffic rates of specific flows, sets of flows, or all flows.

Figure 8A:
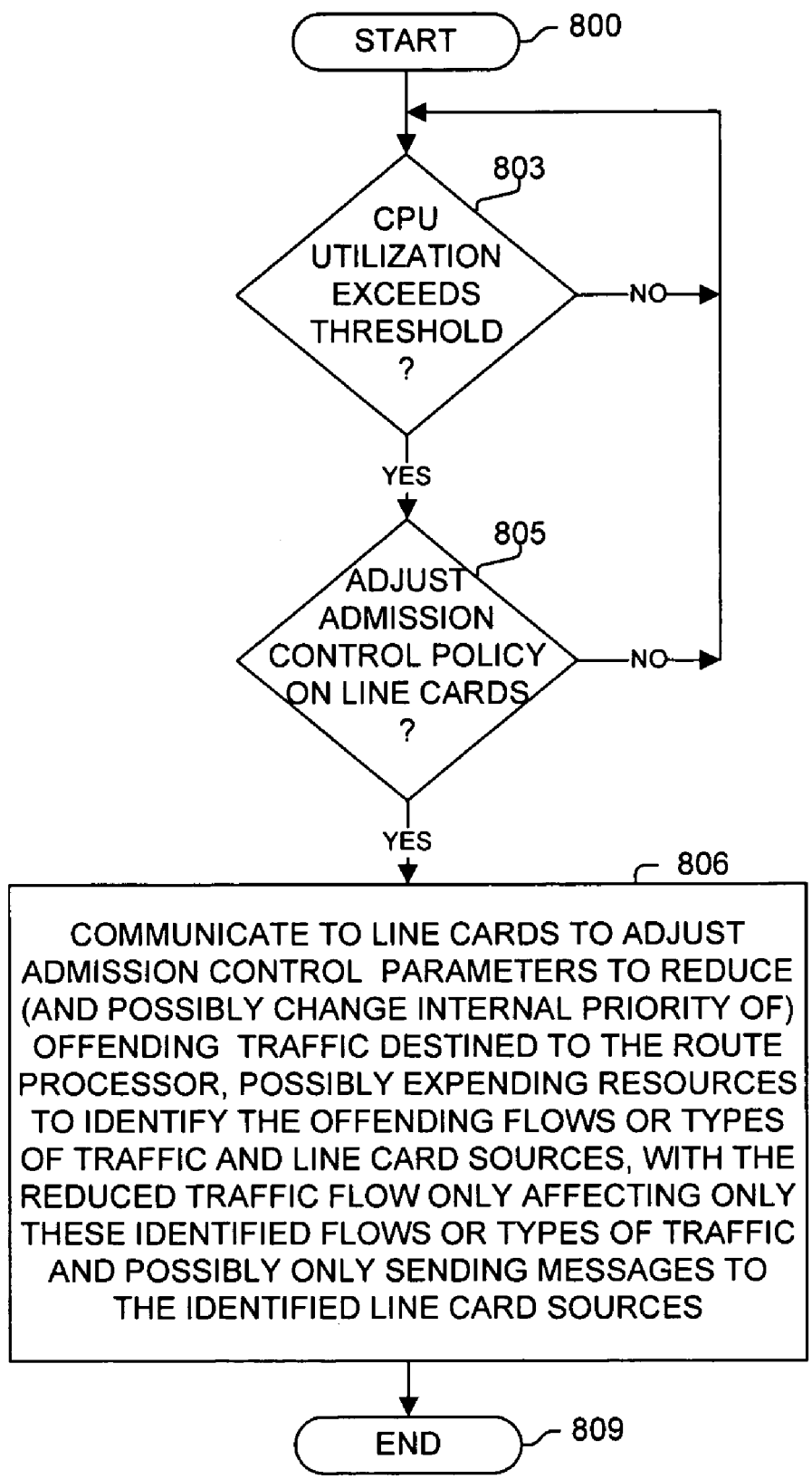
FIGS. 8A-B are flow diagrams illustrating processes used in one embodiment by a route processor to adjust traffic sent to it by the line cards.
Figure 8B:
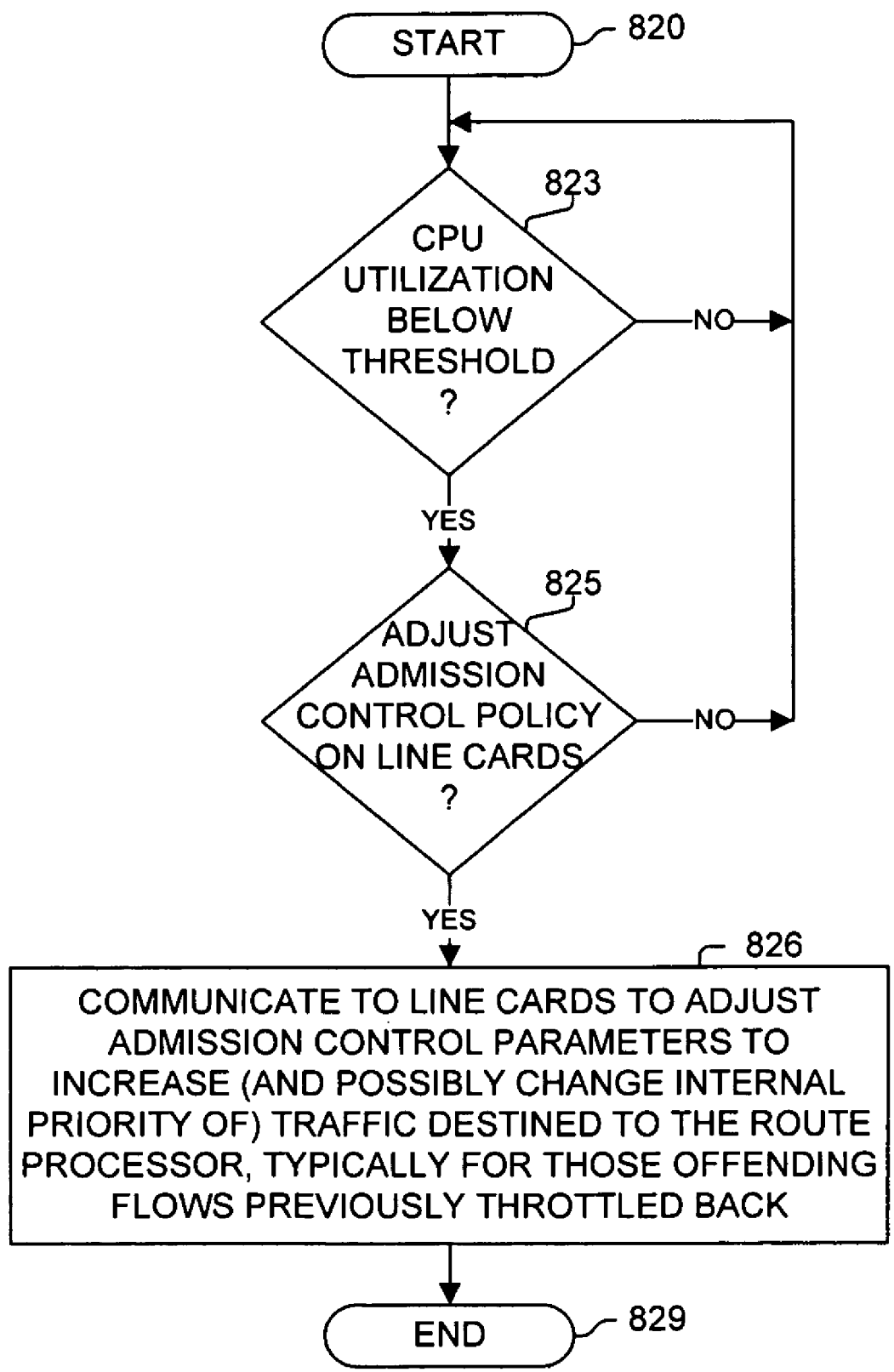

FIGS. 8A-B are flow diagrams illustrating processes used in one embodiment by a route processor to reduce offending traffic or increase traffic levels sent to it by the line cards.

Processing of FIG. 8A to decrease offending traffic sent to it begins with process block 800. As determined in process block 803, if a monitored resource utilization (e.g., CPU load, memory occupancy, external queue sizes, etc.) has not exceeded a predetermined threshold, then no further action is necessary and processing returns to process block 803 (possibly after a delay). Note, one embodiment does not include the operation indicated by process block 803. Otherwise, as determined in process block 805, if instructions should be provided to a line card to reduce the amount of traffic and/or lower the priority of packets of one or more flows of packet traffic destined for the route processor, then in process block 806, such instructions are communicated to all or only the offending line card sources of the offending traffic, possibly after expending resources to identify the offending flow or flows and line card sources and then the reduced traffic flow will typically affect the identified offending sources (e.g., only those flows whose policing rates were decreased). These messages to the line card or cards can take that of an unlimited number of forms. For example, a message might be to adjust the admission control parameters of all flows or a specified list of one or more flows to specified value(s) or by specified fraction(s) or percentage(s) by which to reduce or to which to reduce the flow(s), etc. Processing returns to process block 803.

Processing of FIG. 8B to adjust the admission control parameters enforced by line cards begins with process block 820. As determined in process block 823, if the resource utilization (e.g., CPU load, memory occupancy, external queue sizes, etc.) has not fallen to or below a predetermined threshold, then no further action is necessary and processing returns to process block 823 (possibly after a delay). Note, one embodiment does not include the operation indicated by process block 823. Otherwise, as determined in process block 825, if instructions should be provided to a line card to adjust admission control parameters to increase the maximum rate of packet traffic and/or adjust its internal priority of packets of one or more flows of packet traffic destined for the route processor, then in process block 826, such instructions are communicated to all or less than all of the line card sources for all or a specified list of one or more flows. Typically, this mechanism is used to increase the rate of previously limited or throttled back flows as the identified condition has been removed. These messages to the line card or cards can take that of an unlimited number of forms. For example, a message might be to adjust admission control parameters for all flows or a specified list of one or more flows up to specified value(s) or by specified multiples or percentages by which to increase or to which to increase the flow(s), etc. Processing returns to process block 826.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A routing device, comprising:
    a route processor for processing route updates; and
    a plurality of line cards communicatively coupled to the route processor;
    wherein the route processor includes a route processing mechanism, packet storage for storing packets received from the plurality of line cards, and one or more resource monitoring mechanisms for identifying one or more resource utilization values representative of traffic destined for the route processor and received from the plurality of line cards, wherein said one or more resource utilization values include a measurement of the storage utilization of packets stored in said storage;
    wherein each of the plurality of line cards includes one or more external interfaces for sending and receiving packets; a forwarding lookup mechanism for identifying packets of said received packets destined for the route processor; and an admission control enforcement mechanism for limiting traffic it respectively sends to the route processor; and
    wherein the route processor is configured to communicate with the plurality of line cards in order to cause said admission control enforcement mechanisms of one or more offending line card sources of said line cards to reduce traffic being sent to the route processing mechanism in response to said resource utilization values reaching or exceeding a predetermined value.

2. The routing device of claim 1, wherein each of the plurality of line cards includes a lookup mechanism for identifying admission control parameters for said packets destined for the route processor; and wherein said admission control enforcement mechanism of each of said line cards is configured to enforce said identified admission control parameters for said packets; and wherein said communicating with said line cards in order to cause said admission control enforcement mechanisms of one or more of the said line cards to reduce traffic being sent to the route processing mechanism includes communicating values or instructions for causing modification of at least one of said admission control parameters.

3. The routing device of claim 1, wherein the route processor is configured to said communicate with said line cards in order to said reducing traffic only if the utilization of the route processing mechanism equals or exceeds a predetermined threshold value.

4. The routing device of claim 1, wherein said communicating with said line cards includes broadcasting a packet including said values or instructions.

5. The routing device of claim 1, wherein said traffic being sent to the route processing mechanism includes offending and non-offending flows of traffic, and said route processor is configured to identify said offending flows of traffic; wherein said communicating to reduce traffic includes communicating indications of the offending flows to said offending line card sources; and wherein said offending line card sources are configured to reduce the traffic of the offending flow while not reducing the traffic of the non-offending flows in response to said indications.

6. The routing device of claim 5, wherein said communicating with the plurality of line cards includes sending messages only to said offending line card sources.

7. The routing device of claim 1, wherein said route processor is configured to identify a flow characterization of offending traffic; and wherein said communicating with the plurality of line cards includes providing an indication of the flow characterization; and wherein said admission control enforcement mechanisms of said one or more line cards are configured to react to the indication of the flow characterization in order to reduce or eliminate traffic being sent to the route processor corresponding to the flow characterization.

8. The routing device of claim 1, wherein the route processor is configured to communicate with the plurality of line cards in order to cause said admission control enforcement mechanisms of said one or more of said line cards to increase traffic being sent to the route processing mechanism in response to said resource utilization values equaling or falling below a second predetermined value.

9. The routing device of claim 1, wherein the route processor is configured to process communications application requests originated from remote devices for communicating with the routing device, said applications requests including an offending flow of communications application requests and a non-offending flow of communications application requests; and wherein said route processor is configured to identify the offending flow; and wherein said communicating to reduce traffic includes communicating one or more indications of the offending flow to said offending line card sources; and wherein said offending line card sources are configured to reduce the traffic of the offending flow while not reducing the traffic of the non-offending flows in response to said indications of the offending flows.

10. The routing device of claim 1, wherein said one or more resource utilization values identify a current load on the route processor.

11. A routing device, comprising:

a route processor for processing route updates; and a plurality of line cards communicatively coupled to the route processor;

wherein the route processor includes a route processing mechanism, packet storage for storing packets received from the plurality of line cards, and one or more resource monitoring mechanisms for identifying one or more resource utilization values representative of traffic destined for the route processor and received from the plurality of line cards, wherein said packet storage stores said packets in one or more queues; and wherein said resource utilization values include at least one measurement of a queue depth of packets stored in at least one of said queues;

wherein each of the plurality of line cards includes one or more external interfaces for sending and receiving packets; a forwarding lookup mechanism for identifying packets of said received packets destined for the route processor; and an admission control enforcement mechanism for limiting traffic it respectively sends to the route processor; and wherein the route processor is configured to communicate with the plurality of line cards in order to cause said admission control enforcement mechanisms of one or more offending line card sources of said line cards to reduce traffic being sent to the route processing mechanism in response to said resource utilization values reaching or exceeding a predetermined value.

12. A routing device comprising:

a route processor for processing route updates; and a plurality of line cards communicatively coupled to the route processor, each of the plurality of line cards includes means for identifying, admission control enforcement and forwarding packets of received packets destined for the route processor, said means for admission control enforcement including means for modifying its admission control parameters in response to communication from the route processor; and wherein the route processor includes a means for processing route processor requests and route updates, means for storing packets received from the plurality of line cards, means for monitoring flows of said traffic in order to identify an offending flow, and means for communicating to said line cards to cause at least one of said line cards to modify one or more of its said admission control parameters associated with the offending flow;

wherein the route processor includes means for identifying resource utilization values representative of traffic destined for the route processor and received from the plurality of line cards, said resource utilization values including a measurement of the storage utilization for said means for storing packets; and wherein in response to the storage utilization exceeding a threshold, the route processor is configured to identify the offending flow and to communicate to said line cards to cause at least one of said line cards to modify one or more of its said admission control parameters associated with the offending flow.

13. The routing device of claim 12, wherein said causing at least one of said line cards to modify said admission control parameters associated with the offending flow includes causing two or more of said line cards to modify their respective said admission control parameters associated with the offending flow.

14. The routing device of claim 12, wherein said means for communicating with said line cards includes means for sending a broadcasting packet to each of the plurality of line cards of an indication of the offending flow.

15. The routing device of claim 12, wherein said means for communicating with said line cards includes means for sending packets only to those line cards associated the offending flow.

16. The routing device of claim 12, wherein said resource utilization values include a load utilization value of said means for processing route processor requests and route updates, and wherein the route processor only said communicates to said line cards to cause at least one of said line cards to modify one or more of its said admission control parameters associated with the offending flow when the load utilization value equals or exceeds a predetermined threshold value.

17. The routing device of claim 16, wherein the route processor is configured to communicate with the plurality of line cards in order to cause said admission control enforcement mechanisms of said one or more of said line cards to increase traffic being sent to the route processing mechanism in response to said resource utilization values equaling or falling below a second predetermined value.

18. The routing device of claim 12, wherein the route processor is configured to communicate with the plurality of line cards in order to cause said admission control enforcement mechanisms of said one or more of said line cards to increase traffic being sent to the route processing mechanism in response to said resource utilization values equaling or falling below a second predetermined value.

* * * * *